US011720466B1

(12) United States Patent
Pandey et al.

(10) Patent No.: US 11,720,466 B1
(45) Date of Patent: Aug. 8, 2023

(54) INTERACTIVE GRAPH GENERATION FOR COMPUTATION ANALYSIS

(71) Applicant: Palantir Technologies Inc., Palo Alto, CA (US)

(72) Inventors: Harsh Pandey, New York, NY (US); Jenny Fan, New York, NY (US); Joseph Hashim, Kent (GB); Michal Duczynski, Pecice (PL); Nicolas Trinquier, Peymeinade (FR)

(73) Assignee: Palantir Technologies Inc., Denver, CO (US)

( * ) Notice: Subject to any disclaimer, the term of this patent is extended or adjusted under 35 U.S.C. 154(b) by 430 days.

(21) Appl. No.: 16/844,741

(22) Filed: Apr. 9, 2020

(51) Int. Cl.
  *G06F 11/32* (2006.01)
  *G06T 13/80* (2011.01)
  *G06F 3/0482* (2013.01)

(52) U.S. Cl.
  CPC .......... *G06F 11/323* (2013.01); *G06F 3/0482* (2013.01); *G06T 13/80* (2013.01)

(58) Field of Classification Search
  None
  See application file for complete search history.

(56) References Cited

U.S. PATENT DOCUMENTS

| | | | | |
|---|---|---|---|---|
| 10,091,358 B1* | 10/2018 | Molander | ............. | G06T 11/206 |
| 10,726,507 B1* | 7/2020 | Thouzeau | ............. | G06Q 50/04 |
| 2002/0188597 A1* | 12/2002 | Kern | ....................... | G06Q 30/06 |
| 2004/0078777 A1* | 4/2004 | Bahrami | ............. | G06Q 10/067 |
| | | | | 705/348 |
| 2006/0238538 A1* | 10/2006 | Kapler | .................. | G06Q 10/10 |
| | | | | 345/440 |
| 2008/0059967 A1* | 3/2008 | Matsui | .................. | G06Q 10/00 |
| | | | | 718/102 |
| 2008/0195452 A1* | 8/2008 | Ponce de Leon | .. | G06Q 10/0635 |
| | | | | 705/7.12 |
| 2011/0302090 A1* | 12/2011 | Newpol | ............. | G06Q 10/103 |
| | | | | 705/348 |
| 2012/0253869 A1* | 10/2012 | Ansley | .................. | G06Q 10/06 |
| | | | | 705/7.12 |
| 2013/0159910 A1* | 6/2013 | Bostic | .................. | G06F 11/323 |
| | | | | 715/772 |
| 2014/0172944 A1* | 6/2014 | Newton | .................. | H04L 67/55 |
| | | | | 709/202 |
| 2015/0012330 A1* | 1/2015 | Sugiura | ............. | G06Q 10/0633 |
| | | | | 705/7.26 |
| 2015/0019569 A1* | 1/2015 | Parker | ................. | G06F 16/3344 |
| | | | | 707/748 |

(Continued)

*Primary Examiner* — Haimei Jiang
(74) *Attorney, Agent, or Firm* — Knobbe, Martens, Olson & Bear, LLP

(57) ABSTRACT

A user interface generation system and associated methods are disclosed for displaying nodes of a computer program or computation. The system may determine an ordering and position of elements for display. The ordering can include determining a first ancestor branch of a node associated with a stage with an earliest start time among the start times associated with the stages of a plurality of ancestor branches. This first ancestor branch may be designated as first in the ordering. A second ancestor branch may be determined from among the remaining ancestor branches having an stage with an earliest start time among the start times associated with the remaining stages. This second ancestor branch can be designated as second in the ordering.

22 Claims, 11 Drawing Sheets

(56) References Cited

U.S. PATENT DOCUMENTS

| | | | |
|---|---|---|---|
| 2016/0063192 A1* | 3/2016 | Johnson | G16H 40/20 |
| | | | 705/2 |
| 2017/0269796 A1* | 9/2017 | Wang | G06F 3/0484 |
| 2019/0227777 A1* | 7/2019 | ChoFleming, Jr | G06F 15/82 |
| 2019/0236516 A1* | 8/2019 | Ponnusamy | G06Q 10/063114 |
| 2020/0257732 A1* | 8/2020 | Oh | G06F 16/90348 |
| 2021/0049555 A1* | 2/2021 | Shor | G06Q 10/0635 |
| 2021/0073287 A1* | 3/2021 | Hunter | H04L 9/3239 |
| 2021/0141708 A1* | 5/2021 | Mathur | G06F 11/323 |
| 2021/0201345 A1* | 7/2021 | De Ridder | G06N 5/022 |
| 2021/0256453 A1* | 8/2021 | Morgan | G06Q 10/063112 |

* cited by examiner

INTERACTIVE GRAPH GENERATION FOR COMPUTATION ANALYSIS

BACKGROUND

Field

The present disclosure relates to generation of interactive graphs, and interactive graphical user interfaces associated therewith, for computation analysis.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Graphical user interfaces can be used to display images, such as the progress of a computational analysis. However, significant inadequacies exist in current user interfaces, especially with regard to how the relationship among portions of a computation are presented. One practice for displaying tasks, such as executable tasks and/or stages, is through the use of Gantt charts. Currently, however, Gantt charts and other modalities for displaying and/or interacting with an analysis of the execution of computer tasks have significant deficiencies.

DETAILED DESCRIPTION

Overview

Figure 1:
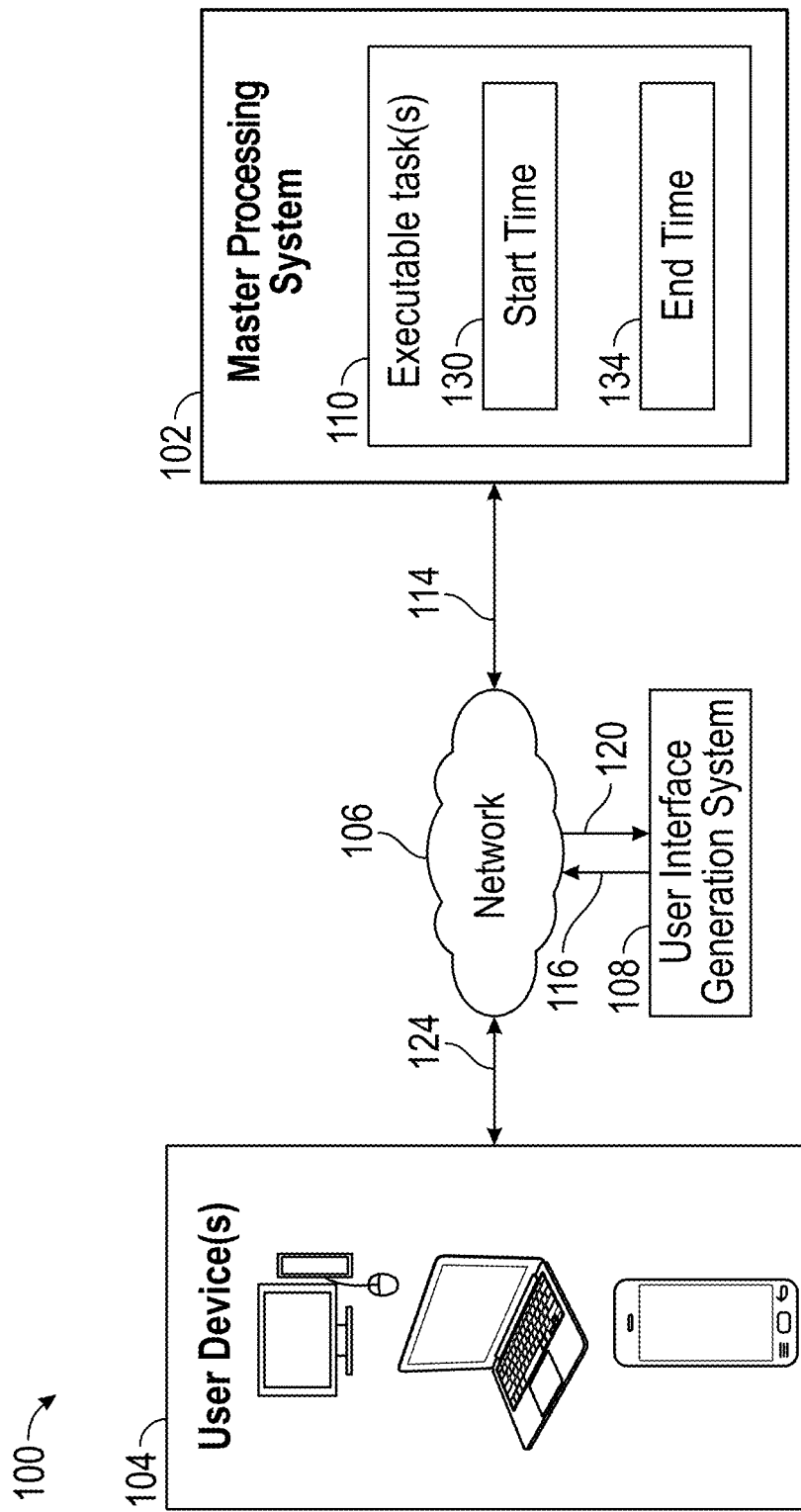
FIG. 1 illustrates a block diagram of an example operating environment in which one or more aspects of the present disclosure may operate, according to various implementations of the present disclosure.

User interfaces can show various aspects of a computation (or program). The computation may include one or more stages, each of which can comprise one or more executable tasks. One or more non-transitory computer processors can be used to execute each executable task. Executors can include one or more computer processors. Executors can be divided and/or dedicated/assigned to the computation of particular tasks and/or stages of a computation.

An interactive graphical user interface can display representations of each task and/or stage of the computation. The planning and analysis of a computation can be done using a project schedule. Gantt charts can generally be useful for showing project schedules for planning an execution of tasks. For example, Gantt charts have application in showing a logical flow of tasks and their prerequisites. Gantt charts have also been used in certain contexts related to tracking the progress of certain tasks. The use of Gantt charts can be applied to the analysis of computer executable functions. Software programs may require computation, which includes the execution of a number of executable tasks. These tasks may have a pre-determined order to them. Gantt charts can be used to track the progress of these executable tasks. However, there are significant gaps in interactive graphical user interfaces that employ such charts for tracking and analyzing the progress and details of the computation of executable tasks. For example, current interactive graphical user interfaces are confusing as they do not clearly show the sequence of executable tasks. The connections among tasks are often overlapping or otherwise unclear. Moreover current versions of Gantt charts often demand a lot of vertical real estate.

Novel user interfaces described herein solve the problems identified above. An example user interface can display a graph or chart, similar in some respects to a Gantt chart, that includes nodes or other indicators representing individual executable tasks and/or stages of a computation, and connections among those nodes. The graph can provide all of the information a user may be interested in viewing for the executable tasks and their relationships with one another. In particular, the user interface can allow a user to view and interact with the linkages among executable tasks in an optimized arrangement. This is achieved by ordering the display of executable tasks based on start times of ancestor branches of each task. The ordering of tasks can be done recursively, which results in a clearer picture of relationships among executable tasks. Moreover, the graph can include indications of the input and output data associated with each executable task. For example, each task can be associated with one or both of an output data indicator and/or an input data indicator. The data indicator can be a bar or node in proximity to a node representing the corresponding executable task.

Moreover, input and output data indicators can indicate relationships among child and parent nodes. Parent or ancestor nodes can refer to prerequisite executable tasks, and child nodes can refer to subsequent or successive executable tasks. A plurality of nodes can be grouped together as a branch of executable tasks. For example, parent/ancestor branches can refer to a plurality of executable tasks that are computed before a child executable task. A relationship between parent nodes and children nodes and/or among various branches can be indicated using lines connecting the parent and children nodes and/or the branches.

Data input and data output indicators can represent an amount or quantity of data that an associated executable task inputs or outputs, respectively. The total size of the output data indicators that are associated with a group of parent executable task nodes can equal a total size (e.g., length) of an input data indicator that is associated with a child executable task. Additionally or alternatively, the user interface can size all of the input and/or output data indicators so that each indicator is proportional in size to the amount or quantity of data input or output from the associated node. Thus, a user can quickly and easily assess the relationship of input and output data associated with parent-child relationships as well as the relationship of input and output data among all of the executable tasks in a project. As executable tasks are executed, the interface can dynamically resize the input and/or output data indicators. For example, if a currently executed executable task takes in an unusually large amount of data, the size of the input data indicator may cause a need for previously sized input and/or output data indicators to be resized.

A user can also apprehend specific details of the project and/or each individual executable task by selecting a corresponding project and/or executable task. For example, a user may mouse over a node representing a corresponding executable task. Based on the mouse-over, the user interface can display a task number, an amount of input data, and/or an amount of output data.

The user interface can include a concurrence graph that identifies how many computer resources are dedicated to each stage of the executable tasks. The concurrence graph can provide a visual indication of computer inefficiencies during certain executable tasks. The concurrence graph may, for example, indicate that few resources are used during certain executable tasks, which could be an indication that the job is inefficiently allocating resources during those executable tasks, particularly if those executable tasks take a long time to execute. A user can select a corresponding indicator representing an executable task and thereby receive details about that executable task (e.g., number of executors/cores dedicated to the task, percent of executors/cores dedicated to task, start time, end time, ratios of usage, percentage of coarse CPU usage). The user can request that a notification be sent to associated engineers. The notification can indicate which executable task(s) constitute a bottleneck during the job. The concurrence graph can be displayed near (e.g., below) the graph. The concurrence graph may be generated in real-time as a currently-executed executable task is being processed.

The improved interactive graphical user interfaces described above have many benefits. For example, users can more easily and compactly view large jobs without having to scroll (e.g., horizontally) to see the complete job. Moreover, as noted above, the relationships among executable tasks within the job are clearer. For example, lines connecting different tasks are less likely to overlap. A user can also identify potential bottlenecks during the job. Moreover, the relative amount of data that each task inputs and outputs is clearly indicated for a user. The user interface is particularly helpful as it is able to update in real-time (e.g., while an executable task is running) the positions of each node, the positions and/or size of associated input/output indicators, the concurrence graph, and other features, which can allow a user monitor progress more clearly and accurately.

A processing system (for convenience, herein referred to as a "master processing system" or a "source processing system") may include one or more processors, spread across numerous locations. Each processor may be configured to execute one or more executable tasks.

A "user interface generation system" is provided that receives data from the master processing system develop display information of the executable tasks. The user interface generation system includes sophisticated data analysis and interactive graphical user interface functionality to enable efficient rendering of the received executable task data.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended), and/or the like. For example, user inputs may comprise a position, orientation, and/or motion of a hand or other appendage, a body, a 3D mouse, and/or the like.

Executable Task: As used in relation to computation, in addition to its ordinary and customary meaning, the term "executable task" includes all types of computations that may be handled by a computer processor. Examples of items, which may or may not be applicable in various implementations of the present disclosure, include software modules, algorithms, and/or the like.

Example Operation System

FIG. 1 illustrates a block diagram of an example operating environment 100 in which one or more aspects of the present disclosure may operate, according to various implementations of the present disclosure. The operating environment 100 may include a master processing system 102, one or more user devices 104, and a user interface generation system 108. The various devices may communicate with one another via, e.g., a communications network 106, as illustrated.

In general, the master processing system 102 (also referred to herein as a "source processing system") may comprise a computing system, including a plurality of data stores, databases, memories, processors, network interfaces, and the like, by which scheduling of a large number of items is managed. The master processing system 102 may execute one or more executable tasks 110. Each of the executable tasks 110 has a corresponding start time 130 and an end time 134. Thus, each of the executable tasks 110 has a duration.

The master processing system 102 may further collect and communicate data associated with the executable tasks 110 to the communications network 106. The executable tasks 110 may be associated with one or more stages. Each stage may include one or more executable tasks 110.

In some implementations, the master processing system 102 may execute the one or more executable tasks 110 and track the start time 130 and/or the end time 134. The executable tasks 110 can determine the task duration based on the start time 130 and end time 134 (e.g., by subtracting the two). In some embodiments, the end time 134 is not identified until the executable task 110 has been fully executed. The master processing system 102 can submit information related to each executable tasks 110 to the communications network 106 via the route 114. The master processing system 102 may transmit the data in real-time (e.g., while an executable task 110 is still being executed by the master processing system 102). The route 114 may be a wired or wireless route.

The master processing system 102 may track other data additionally or alternatively. This other data may be passed to the communications network 106. For example, the amount of data that is output by and/or input into a particular executable task 110 may be tracked by the master processing system 102. Additionally or alternatively, the master processing system 102 may track and relay the number of processors and/or executors that are dedicated to the processing of each of the executable tasks 110. The master processing system 102 may also track and output the links among various executable tasks 110. For example, the master processing system 102 may identify an ancestor task and/or ancestor branch of a particular executable task 110.

The master processing system 102 can include a single processing system or in some embodiments may be a cloud-based processing system. For example, the master processing system 102 may be configured to draw processing resources from a pool of processing power as needed. Additionally or alternatively, the master processing system 102 may offload unused processing resources from the executable tasks 110 so that, for example, other executable tasks may be processed.

The user interface generation system 108 may communicate (e.g., via routes 120 and/or 116) with various user device(s) 104, via network 106, to provide various interactive graphical user interfaces for updating schedules of items, and described herein in detail. The user devices 104 communicate with other elements of the operating environment 100 via the route 124. For example, the user device(s) 104 may receive GUI data from the user interface generation system 108 (via the communications network 106). Additionally or alternatively, the interface of the user device(s) may be interactive. Thus, in some implementations, the user device(s) may pass information to the master processing system 102 and/or the user interface generation system 108 (via the communications network 106) across route 124.

In some implementations, the features and services provided by the user interface generation system 108 may be implemented as web services consumable via the network 106. In further implementations, the user interface generation system 108 is provided by one or more virtual machines implemented in a hosted computing environment, as further described below. The hosted computing environment may include one or more rapidly provisioned and released computing resources, which computing resources may include computing, networking and/or storage devices.

The user interface generation system 108 can be configured to generate an interactive graphical user interface ("GUI"). Such GUIs are described in further detail below. For example, the user interface generation system 108 may determine and/or receive details related to the executable tasks 110, such as the start time 130, the end time 134, the duration, and/or other details of the executable tasks 110. However, in some implementations, the user interface generation system 108 receives such information from the master processing system 102 and/or from other elements of the operating environment 100. The functionality of the user interface generation system 108 is described in further detail in FIGS. 2-6, 7A-7B, and 8A-8B below.

Various example user devices 104 are shown in FIG. 1, including a desktop computer, a laptop, and a mobile phone, each provided by way of illustration. In general, the user devices 104 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 104 may execute an application (e.g., a browser, a stand-alone application) that allows a user to access and interact with interactive graphical user interfaces as described herein.

The network 106 may include any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some implementations, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Further details and examples regarding the implementations, operation, and functionality, including various interactive graphical user interfaces, of the various components of the example operating environment 100 are described herein in reference to various figures.

Example Interactive Graphical User Interfaces

Figure 2:
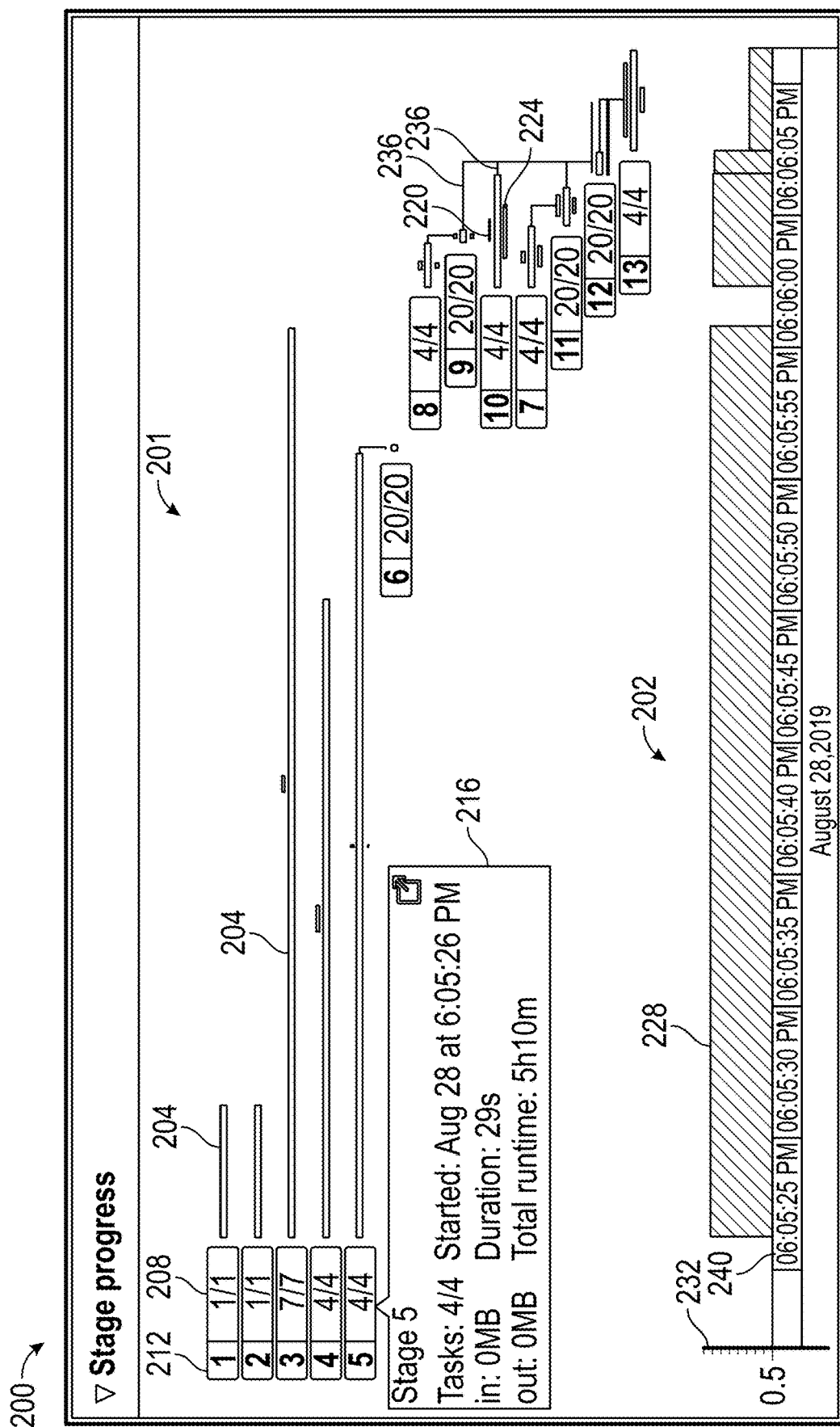
FIG. 2 illustrates an example interactive graphical user interface, according to various implementations of the present disclosure.

FIG. 2 illustrates an example interactive graphical user interface 200, according to various implementations of the present disclosure. As described herein, the example interactive graphical user interface 200 may be provided via data from the user interface generation system 108 that is rendered by a browser of user device(s) 104.

The example interactive graphical user interface 200 includes a stage graph 201 and a concurrence graph 202. The stage graph 201 shows linkages among various stages or executable tasks. The stage graph 201 shows a plurality of nodes 204 that each represent a stage or executable task. The stage graph 201 includes completion indicators 208 and stage indicators 212 associated with each node 204. The stage graph 201 can further include an attribute display 216. The attribute display 216 may be displayed in response to a user selection, discussed in more detail below. The attribute display 216 may include a stage number, a progress indicator, a data input indicator, a data output indicator, a start time, a task duration, a total duration, or the like. The stage graph 201 includes respective input data indicators 220 and output data indicators 224 for associated nodes 204. The stage graph 201 includes one or more connection indicators 236.

The nodes 204 can represent individual executable tasks or stages. Stages can each include one or more executable tasks. The computation is represented by the stage graph 201. The size (e.g., length, thickness) of the nodes 204 can represent the computation time to execute each associated stage of the computation. As shown, the length of the nodes 204 represents the computation time, with node start position and end position plotted according to a time axis or time meter 240 of the concurrence graph 202.

Each of the nodes 204 is displayed vertically displaced from other nodes. Vertical displacement does not necessarily require any particular vertical alignment. Rather, vertically displaced generally means having at least some portion of a node at a different vertical position than another node 204. Other display techniques may be used. For example, each of the nodes 204 may be disposed at a different horizontal displacement from other nodes. In certain embodiments, each of the nodes 204 can be displaced along a different axis (e.g., diagonal).

Corresponding stage indicators 212 and completion indicators 208 are displayed in proximity to associated nodes 204 (e.g., horizontally disposed from a terminus of the corresponding node 204). The completion indicator 208 indicates what portion of the stage has already been executed by the computer (e.g., the master processing system 102 described above). As shown, stages may include a single executable task that has already been completed, indicated by a "1/1", but others are shown, such as a 4-task stage (e.g., a stage that includes four executable tasks) that is completed, indicated by a "4/4". Those have not been completed can be indicated by a ratio that is less than one (e.g., 1/4, 2/5). As shown, the stage indicators 212 indicates a stage order of each associated stage, indicated by a corresponding node 204. For example, the stage order may represent the order that the stages are executed. In some embodiments, the stage indicators 212 can represent or show or correspond to a block of executable logic that defines the computation or computations to be performed in a given stage.

Connections between or among the nodes 204 are indicated by corresponding connection indicators 236. The connection indicators 236 can be a line or curve that connects nodes 204 to each other and/or to other connection indicators 236. One or more prerequisite nodes 204 can be indicated by a plurality of connection indicators 236 that meet at a common point. The connection indicators 236 that meet at a common point can be indicative of corresponding branches (e.g., ancestor branches). Branches can include one or more nodes 204. Ancestor branches include one or more nodes 204 that are prerequisite stages (e.g., executable tasks) to a particular node or branch.

A concurrence graph 202 can provide a quick summary of computing resources (e.g., number of processors or executors, power consumption, etc.) that are dedicated to different stages or tasks of the computation. As shown in FIG. 2, the concurrence graph 202 is disposed near the stage graph 201. The concurrence graph 202 is disposed vertically from the stage graph 201 but may be disposed elsewhere signifying a relationship to the stage graph 201. For example, as shown in FIG. 2 the concurrence graph 202 can share a common time axis with the stage graph 201. This layout enables visually correlating/overlaying execution of particular stages with computation resource utilization. For instance, the concurrence graph 202 shows a flat-lining (e.g., zero or near-zero level) of resource utilization around 6 pm and then a rapid increase that corresponds to the gap between stage 3 finishing computation and computation of stages 7 through 10 not having started yet. Alternatively, the concurrence graph 202 could be disposed horizontally displaced from the stage graph 201. Other alternatives are possible. For example, elements of the concurrence graph 202 could be broken into individual components, each included within portions of the stage graph 201.

The concurrence graph 202 includes one or more concurrency indicators 228, a processing meter 232 and a time meter 240. The concurrency indicators 228 correspond to one or more executable tasks represented by associated nodes 204. The processing meter 232 and the time meter 240 serve as an x-y graph that describe the demand on processing resources over time. In some implementations, the time meter 240 is displayed with the stage graph 201 instead of with the concurrence graph 202. Because the time meter 240 tracks the timing of execution of executable tasks, the time meter 240 may be included with the stage graph 201, the concurrence graph 202, or both. The processing meter 232 indicates levels of extent of processing resources dedicated to each associated set of executable tasks. For example, the processing meter 232 indicates heights of concurrency indicators 228 that correspond to a particular use of processing resources. The time meter 240 indicates a time when the resources were used. As shown, the concurrency indicators 228 indicate that a constant amount of processing resources are dedicated and/or used for particular stages of progress. For example, one stage may require more processing resources than another stage, and corresponding concurrency indicators 228 may have different heights within the concurrence graph 202, indicating the relative processing power dedicated to the respective stages. Certain embodiments may include variable demands of resources during a particular stage.

The concurrence graph 202 may be updated in real time. For example, the length of the concurrency indicator 228 may increase during the execution of the corresponding stage/executable task. In some embodiments, the indication of processing resources used (e.g., height of the concurrency indicator 228) is determined throughout (e.g., at each time point) execution of the stage(s)/executable task(s). For example, the height of the concurrency indicator 228 may be calculated based on a total amount of computing/processing resources used throughout execution of the stages that are executed simultaneously. For example, as shown, the concurrency indicator 228 represents the processing resources used by a plurality of tasks running concurrently (e.g., represented by nodes 204 that overlap directly above/below each other). This determination may be made during execution of a group of stages that are executed concurrently. In an implementation, the amount of processing power that needs to be allocated may be based on a peak amount of processing power that will be required at some point during the execution of a single stage. Thus, the concurrence graph 202 can provide valuable insight into the efficiency of running certain stages simultaneously. Even modest changes to the order and/or length of a particular stage and/or executable task can result in significant improvements in efficiency of the program.

Figure 3:
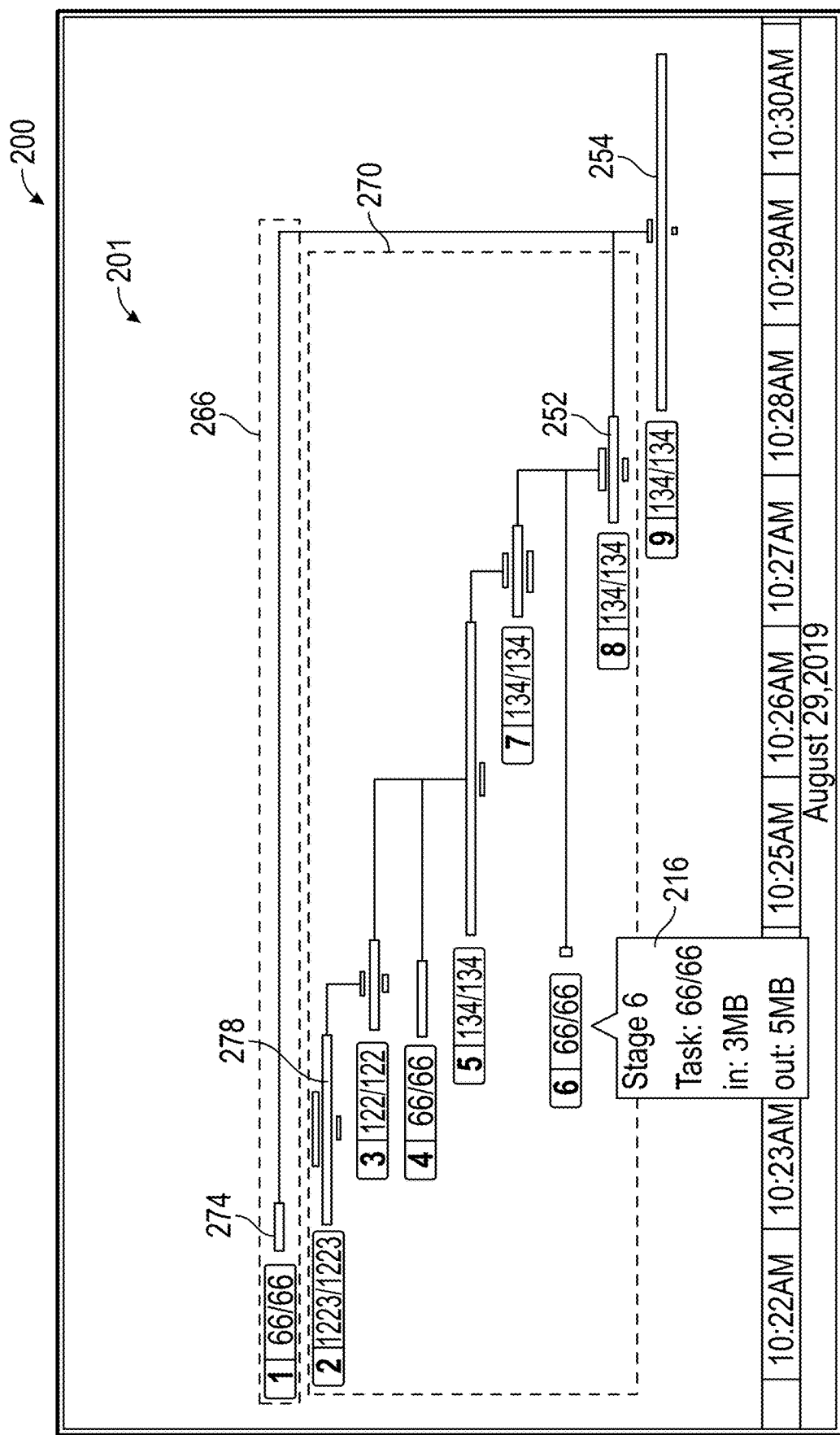
FIG. 3 shows an example of a stage graph having a base node, a first ancestor branch, and a second ancestor branch, according to one or more embodiments.

FIG. 3 shows an example of a stage graph 201 having a base node 254 and a first ancestor branch 266 and a second ancestor branch 270. The first ancestor branch 266 of FIG. 3 can be identified by a characteristic (e.g., start time, end time, duration) of one of its constituent nodes. For example, the first ancestor branch 266 may be determined by constituent sub-node 274 having the earliest start time, as shown in FIG. 3. The sub-node 278 of the second ancestor branch 270 similarly has the earliest start time of its corresponding ancestor branch. The base node of the second ancestor branch 270 is node 252, which is described in more detail with respect to FIG. 4 below.

The first ancestor branch 266 is displayed at the top of the stage graph 201 because sub-node 274 of the first ancestor branch 266 has the earliest start time of any node in the stage graph 201. The sub-node 274 of the first ancestor branch 266 also has the earliest start time of any of the constituent sub-nodes of the first ancestor branch 266 (in this case it is the only such sub-node). If other sub-nodes were available in first ancestor branch 266, then they would be displayed below the sub-node 274 of the first ancestor branch 266 but above each sub-node in the second ancestor branch 270. As used herein, "above," "below," "highest," "lowest," and similar references to relative vertical position each broadly reference a vertical displacement and not necessarily a vertical alignment. Other embodiments where horizontal and/or other displacement axes are alternatives. Moreover, "sub-node" refers generally to an ancestor node (or prerequisite node, parent node, etc.) of another node, and in this case the term refers to an ancestor node of the base node 254.

Once all of the positions of each of the sub-nodes in the first ancestor branch 266 have been determined, positions of each of the sub-nodes in the second ancestor branch 270 are determined. The sub-node 278 in the second ancestor branch 270 has the earliest start time and so is displayed as the highest sub-node in the second ancestor branch 270 (e.g., below all of the sub-nodes of the first ancestor branch 266). Thus, in both ancestor branches 266, 270, the corresponding sub-nodes 274, 278 are displayed highest when compared to other sub-nodes in the same ancestor branch.

If a third or fourth ancestor branch were present, such a branch would be dealt with similarly (e.g., an earliest-starting sub-node would be displayed highest among its sub-nodes but below the first and second ancestor branches 266, 270). Moreover, this process is recursive. An ancestor branch may itself comprise multiple sub-ancestor branches and sub-sub-ancestor branches, each having sub-sub-nodes and sub-sub-sub-nodes, respectively.

A system (e.g., the master processing system 102 of FIG. 1) may be configured to execute the executable tasks or stages. Data for a user interface (e.g., the graphical user interface 200) may be prepared by another device or system. A user interface generation system (e.g., the user interface generation system 108 of FIG. 1) may be configured to generate data for display by user devices. The user interface generation system (or simply "system") may receive a plurality of stages each having an associated duration of time, start time, and end time. The system (e.g., the user interface generation system 108 of FIG. 1) determines a base stage having a latest end time of the plurality of stages. The system then determines a plurality of ancestor branches of the base stage. The ancestor branches may each include constituent nodes, such as sub-nodes of the base stage). Each of the plurality of ancestor branches can include respective stages of the plurality of stages.

The system determines an ordering of the plurality of ancestor branches. The ordering can determine how corresponding nodes/sub-nodes associated with the stages will be displayed. One advantage of the systems and methods described herein is that they allow a user to quickly and accurately identify details and relationships of stages. Developing the ordering includes determining that a first ancestor branch includes a stage with an earliest start time among the start times associated with the stages of the plurality of ancestor branches. For example, the ancestor branches 250 of FIG. 4 would each have an earliest-starting stage. In FIG. 3, the sub-node 274 of the first ancestor branch 266 has the earliest start time of any node in that stage graph 201. Once the first ancestor branch has been identified, then that branch is designate as first in the ordering.

Similarly, a second ancestor branch of the plurality of ancestor branches (except the first ancestor branch) is identified. The second ancestor branch (e.g., the second ancestor branch 270 of FIG. 3) includes a stage with an earliest start time among the start times associated with the stages of the remaining plurality of ancestor branches. This second ancestor branch is then designated as second in the ordering. A similar process could apply to a third, fourth, or more ancestor branches to the base node.

Once the ordering has been identified, the system generates user interface data configured for displaying a base node representing the base stage (e.g., the base node 254 of FIG. 3). The system can be configured to display sets of sub-nodes representing the respective stages of the first and second ancestor branches. Each sub-node of the first set of sub-nodes can be displayed at a different location (e.g., vertically displaced) from each sub-node of the second set of sub-nodes. This is based on the ordering identified above. A first connector that indicates a connection between the base node and sub-nodes of the first set of sub-nodes can be displayed. Other connectors can be displayed as well, such as connectors indicating connections between the base node and sub-nodes of the second set of sub-nodes.

The system can receive a user selection (e.g., a click, mouse-over, data entry, radio button) of a base node, a sub-node of the first set of sub-nodes, and/or a sub-node of the second set of sub-nodes. Based on this user selection, an attribute of the corresponding stage associated with the selected node or sub node can be displayed.

More complex graphs can include a sub-base stage. The sub-base stage can refer to a new reference node (e.g., from one of the ancestor branches) from which to further specify the ordering. The sub-base stage can be the one of the ancestor branches having a latest end time of the remaining stages. Similarly, one or more ancestor sub-branches of the sub-base stage can be determined. Ordering the plurality of ancestor sub-branches may be based on the earliest start times of the stages associated with the respective ancestor sub-branches.

The system can configure the display of a base sub-node representing the sub-base stage of the ancestor branch and additional sets of sub-nodes (or sub-sub-nodes) representing the respective stages of the respective one or more ancestor sub-branches. Each set of sub-nodes of the additional sets of sub-nodes can be displayed displaced (e.g., vertically, horizontally) from each sub-node of the additional sets of sub nodes based at least in part on the ordering. Additional connectors between the base sub-node and the sub-nodes (or sub-sub-nodes) may be displayed. The system can conduct further recursive ordering, as necessary, to order further ancestor sub-branches of each of the sub-branches, parts or all of which may be similarly displayed.

The system may determine a total length of an input data indicator associated with the base node. The determination may include determining a total data output from all stages of each of the plurality of ancestor branches feeding into the associated base node (e.g., those having a latest end time of the respective plurality of ancestor branches).

Based on the determination of the total data output, the system can generate user interface data configured for displaying the input data indicator. The input data indicator may have a length associated with a total length of corresponding output data indicators associated with all of the stages feeding into the base node. This can signify that the amount of data output from all of the direct feeder nodes equals the data input into the stage associated with the base node. Similar determinations of other nodes and their associated input data indicators may be determined. The length of the displayed input data indicator having the length associated with the total length of corresponding output data indicators.

Figure 6:
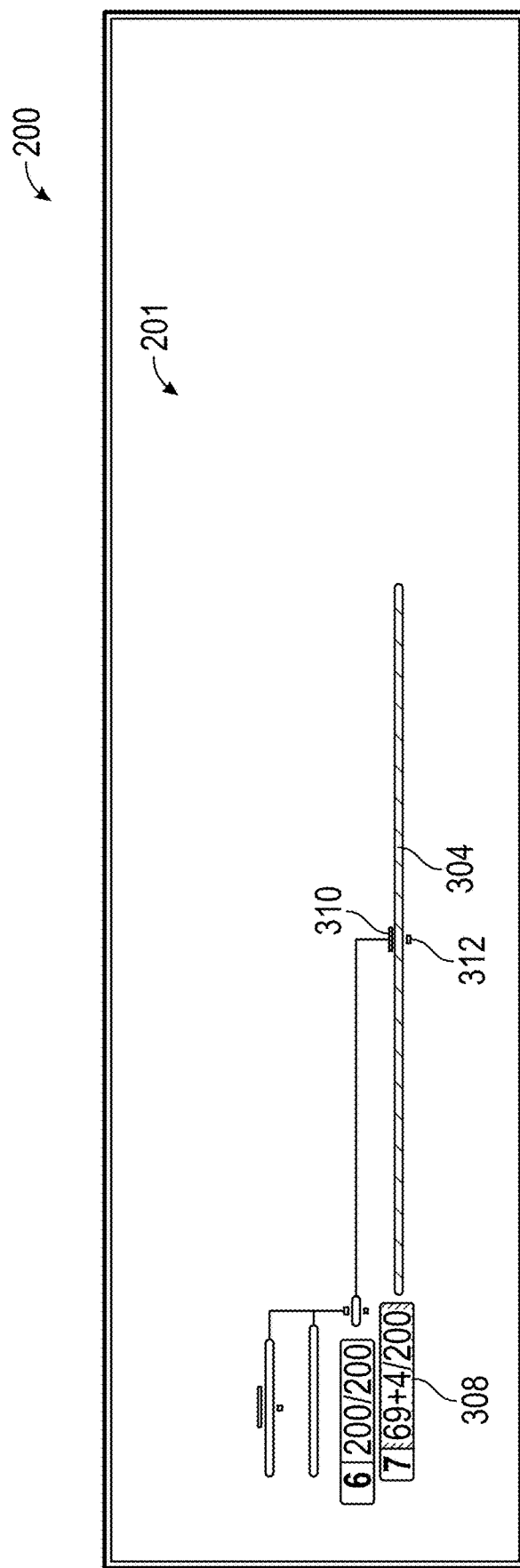
FIG. 6 shows another example interactive graphical user interface, according to one or more embodiments.

The size (e.g., length) of the nodes can be determined by the amount of a certain characteristic associated with that node. This size can be determined in relation to other nodes in the program, other nodes in the stage, other nodes in a particular branch, or by some other metric. For example, the length of the nodes may represent the length of time the system took to execute that task or stage. In some embodiments, the system may dynamically adjust the size of the node while the stages are executed. As a stage is executed, for example, the user interface may reduce a size of the other nodes (e.g., those already completed), increase the size of the executing stage, or both. As indicated in FIG. 6 below, a currently executing stage may be displayed in a different color or with some other characteristic (e.g., blinking, highlighted, animated).

With continued reference to FIG. 3, a user may select a particular node or other feature within the stage graph 201. In response to the user selection, the system can display an attribute display 216. The attribute display 216 may provide information about the corresponding node or other feature. For example, as shown, the attribute display 216 shows a stage number ("Stage 6"), a progress indicator ("Tasks: 66/66"), a data input indicator ("in: 3 MB"), and a data output indicator ("out: 5 MB"). As shown in FIG. 2, the attribute display 216 may include additional or alternative data, such as a start time, a duration, a total duration to that point, etc. Other variants are possible, including different combinations or order of the indicators. The user selection can include a mouse-over, a click, a tap, a pinch, a reverse-pinch, or some other selection.

Figure 4:
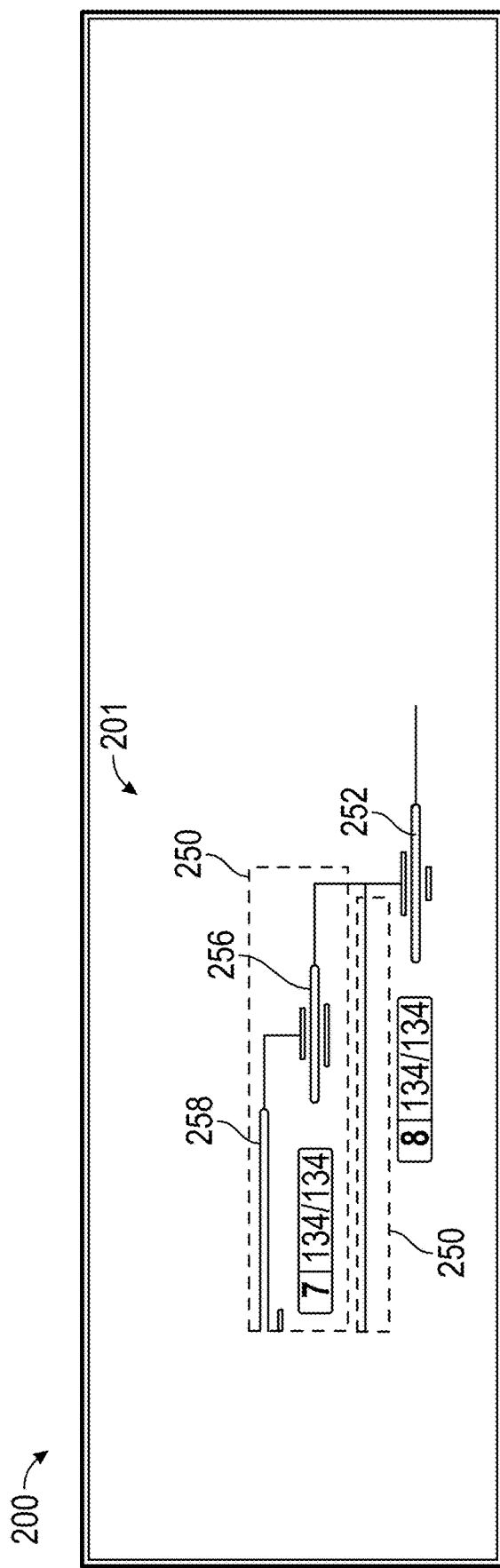
FIG. 4 shows a stage graph that includes two ancestor branches, according to one or more embodiments.

FIG. 4 shows a portion of a stage graph 201 that includes two ancestor branches 250. FIG. 4 shows a portion of the stage graph 201 shown in FIG. 3. In particular, all of the nodes described in FIG. 4 are within the second ancestor branch 270 shown in FIG. 3. FIG. 4 shows a set of sub-ancestor branches 250 (or nested ancestor branches) of node 252 from FIG. 3. As described herein, these sub-ancestor branches of base sub-node 252 may be processed recursively in a manner similar to the ancestor branches described above in reference to FIG. 3 to determine ordering of the sub-nodes of the ancestor branches. One of the many benefits of certain implementations of the graphical user interface 200 are that a user can quickly and easily ascertain what stages are prerequisite and/or prior to other stages. The ancestor branches 250 each represent one or more stages (or executable tasks) that are prerequisite to a completion of the base node 252. The ancestor branches 250 may be comprised of one or more sub-nodes 256, 258. Thus, the sub-nodes 256, 258 can represent prerequisite nodes of the base node 252.

Figure 5:
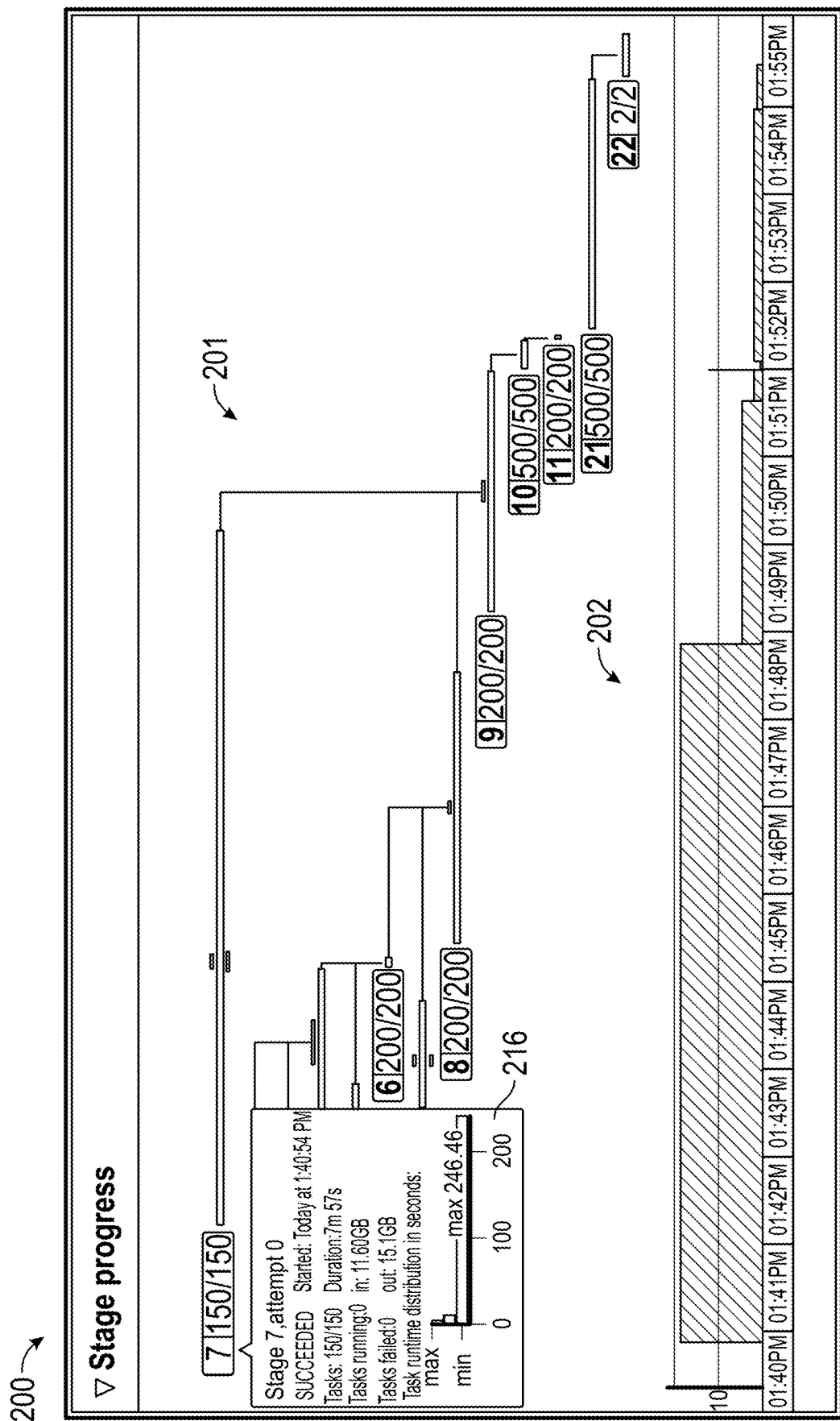
FIG. 5 shows another example interactive graphical user interface, according to one or more embodiments.

FIG. 5 shows another example graphical user interface 200, according to one embodiment. Another example stage graph 201 and concurrence graph 202 are displayed. The attribute display 216 also shows a different combination of information that may be displayed in response to a user selection. As shown, the attribute display 216 can include, in addition or alternative to features described above, a number of attempts (e.g., failed attempts, successful attempts), a status (e.g., "SUCCEEDED"), a current task number, a task failure indicator, a stage duration, and/or a stage performance chart. The stage performance chart can include a minimum, median, and/or maximum length of execution time of constituent executable tasks. For example, the stage shown represents a 150-executable-task stage that included an executable task having a maximum duration of 246.46 seconds. In some examples, a user may select one or more elements of the stage performance chart within the attribute display 216 to display the corresponding element (e.g., min, median, max) of the stage performance chart. In some embodiments, the stage performance chart is displayed separately from the attribute display 216 (e.g., not within the attribute display 216).

FIG. 6 shows an example in-progress node 304 and in-progress completion indicator 308 within another example stage graph 201. In some embodiments, the in-progress node 304 may be displayed differently than other nodes in the stage graph 201. For example, the in-progress node 304 and/or the in-progress completion indicator 308 may be displayed in a different color, a different shading, a highlighting, or other difference. The in-progress node 304 may change its relative size (e.g., length) relative to other nodes during its computation. For example, as its computation time increases, other nodes may become relatively smaller, the in-progress node 304 may become relatively bigger, or both. The in-progress completion indicator 308 may indicate a number of executable tasks that are currently being executed (e.g., "4" as indicated by the "69+4/200").

As computation continues in real time, the sizes of various elements can change dynamically. For example, as noted above, the size (e.g., length) of the in-progress node 304 can change as the time for processing the corresponding stage increases. Additionally or alternatively, the size of other nodes in the stage graph 201 may decrease in size. The relative size of the associated input data indicator 310 and/or the output data indicator 312 can also change dynamically. For example, as the computation continues, additional input data may be received by the associated executable task. Thus, the input data indicator 310 may grow in size. Additionally or alternatively, the input data indicators associated with other nodes may shrink. Similarly, the output data indicator 312 may grow in size as the associated executable task outputs additional data for use by another executable task. Thus, the output data indicator 312 may grow over time and/or the output data indicators of other nodes may shrink. Other alternatives are possible.

Figure 7A:
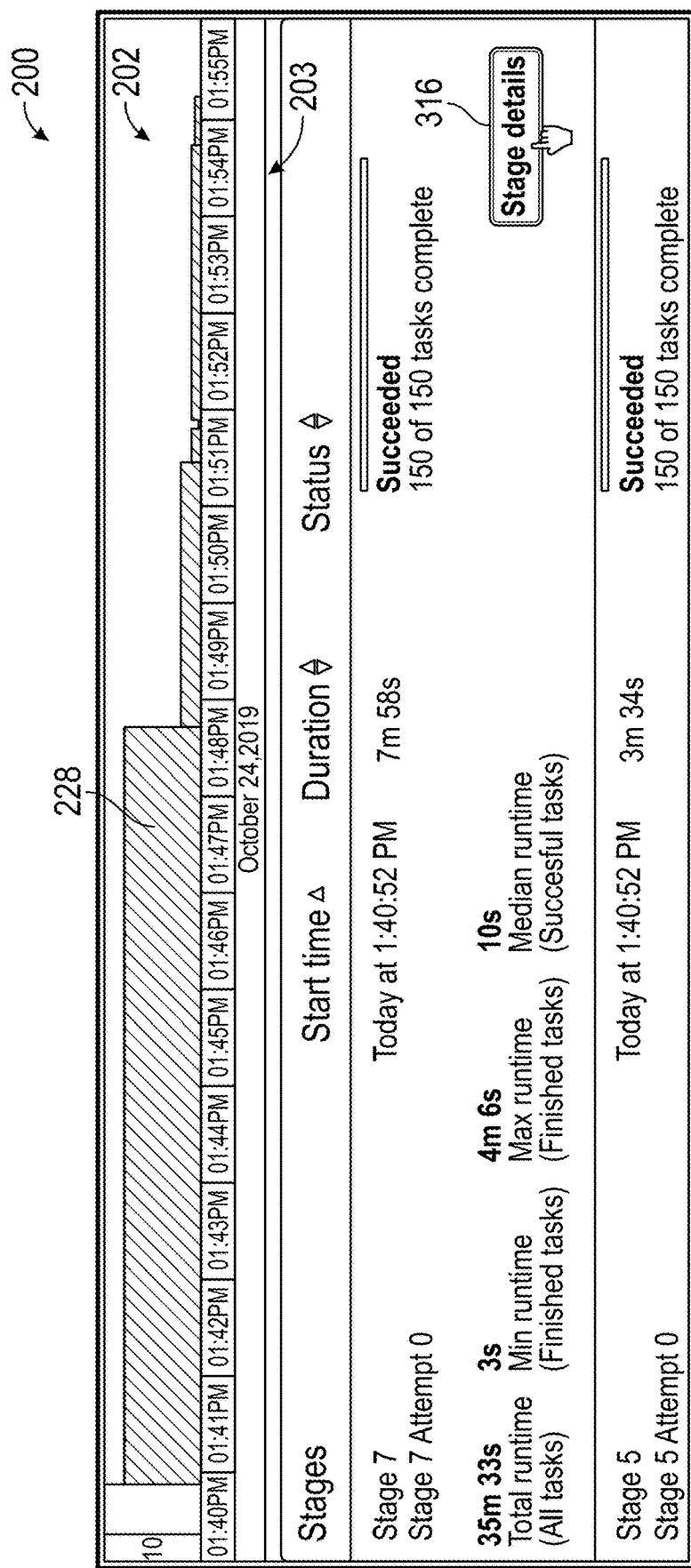
FIG. 7A shows an example concurrence graph that includes a stage detail interface, according to one or more embodiments.

FIG. 7A shows an example concurrence graph 202 that includes a stage detail interface 203, according to one embodiment. A stage graph may be displayed above the concurrence graph 202 by the graphical user interface 200. The stage detail interface 203 can indicate how many programs (e.g., computations) have been, are, and/or will be executed by the system. Various details of each program may be displayed, such as its duration, start time, end time, number of successful tasks, minimum runtime executable task, median runtime executable task, maximum runtime executable task, number of stages, number of executable tasks, number of attempts, etc. The stage detail interface 203 shown includes a stage analysis selector 316. If a user selects the stage analysis selector 316, the graphical user interface 200 can display a stage analysis interface 320, shown in FIG. 7B.

Figure 7B:
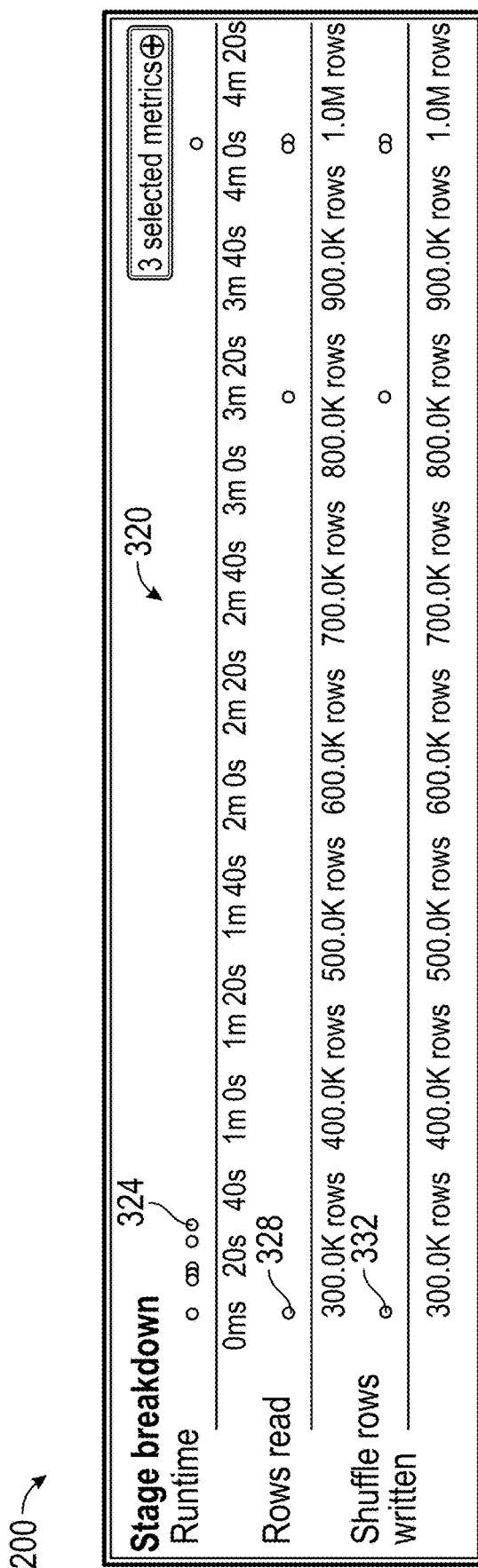
FIG. 7B shows an example stage analysis user interface that includes various details of the one or more stages, according to one or more embodiments.

FIG. 7B shows an example stage analysis interface 320 that includes various details of the one or more programs. The stage analysis interface 320 can include runtime indicators 324, rows-read indicators 328, and/or shuffle-rows-written indicators 332. The stage analysis interface 320 can enable a user to choose from additional metrics for the computation stage. The runtime indicators 324 may show a chart or graph of the runtime of each constituent stage and/or executable task of a selected program (e.g., a program associated with the stage analysis selector 316 selected by the user). As shown, many of the executable tasks clustered between about 0 ms and 20 ms in length. However, at least one executable task took over 4 minutes to compute. Such data can be valuable for a data scientist to apprehend, particularly if the data can be tracked quickly and/or during real-time execution of a program. One or more selectors (e.g., the selector labeled "3 selected metrics") may be included that, when selected, cause the system to display additional statistics or metrics about the computation of the stage, such as a total duration, total resources used, etc.

The rows-read indicators 328 can similarly show a chart or graph. The rows-read indicators 328 tells how many rows of data a stage and/or executable task required. The shuffle-rows-written indicators 332 can display how many shuffle rows were written by each stage and/or executable task of the program. Taken together, the details of the stage analysis interface 320 can provide a powerful analysis interface for a data scientist who is analyzing computations.

Figure 8A:
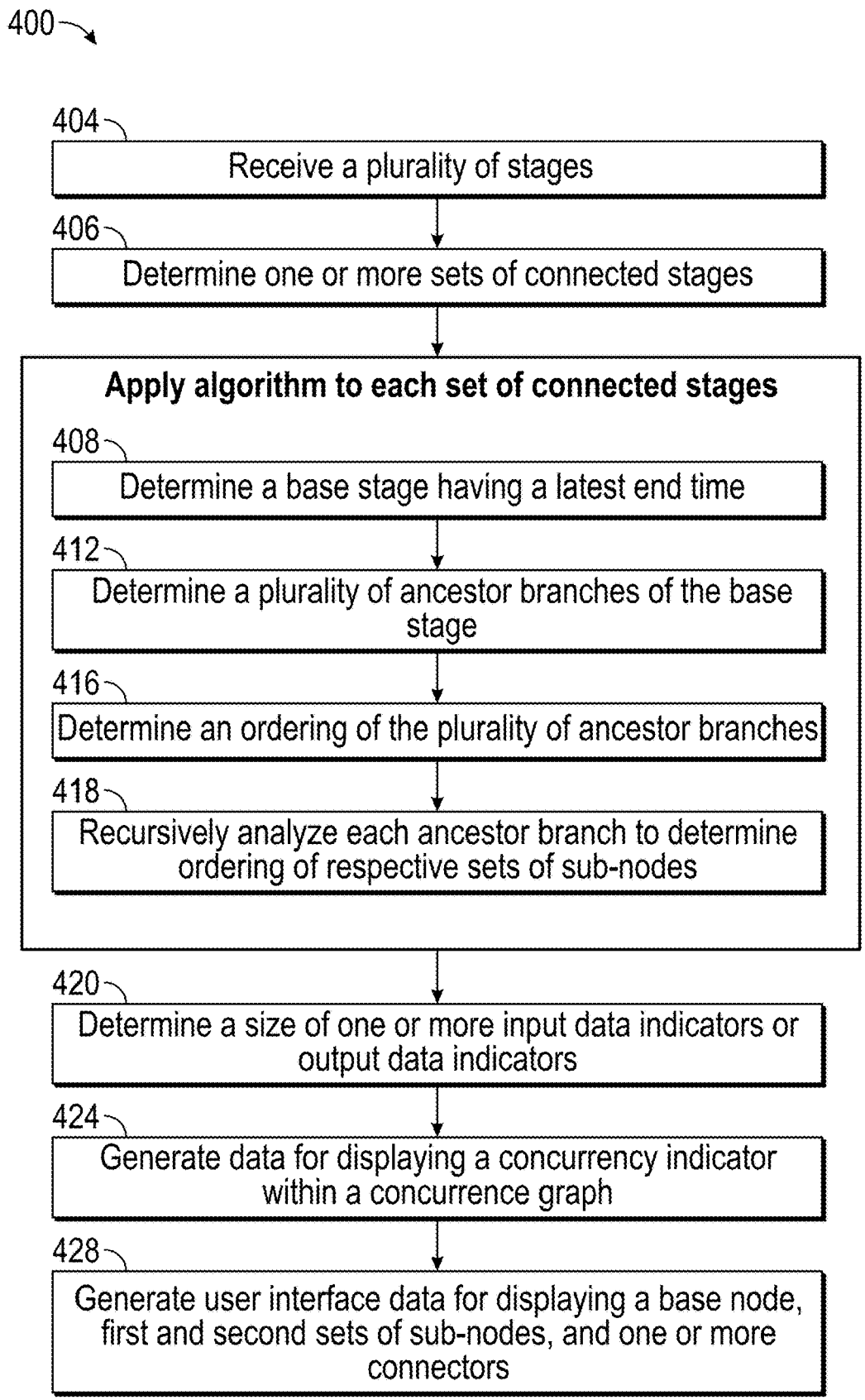
FIGS. 8A shows an example method for displaying computation analysis, according to one or more embodiments.
Figure 8B:
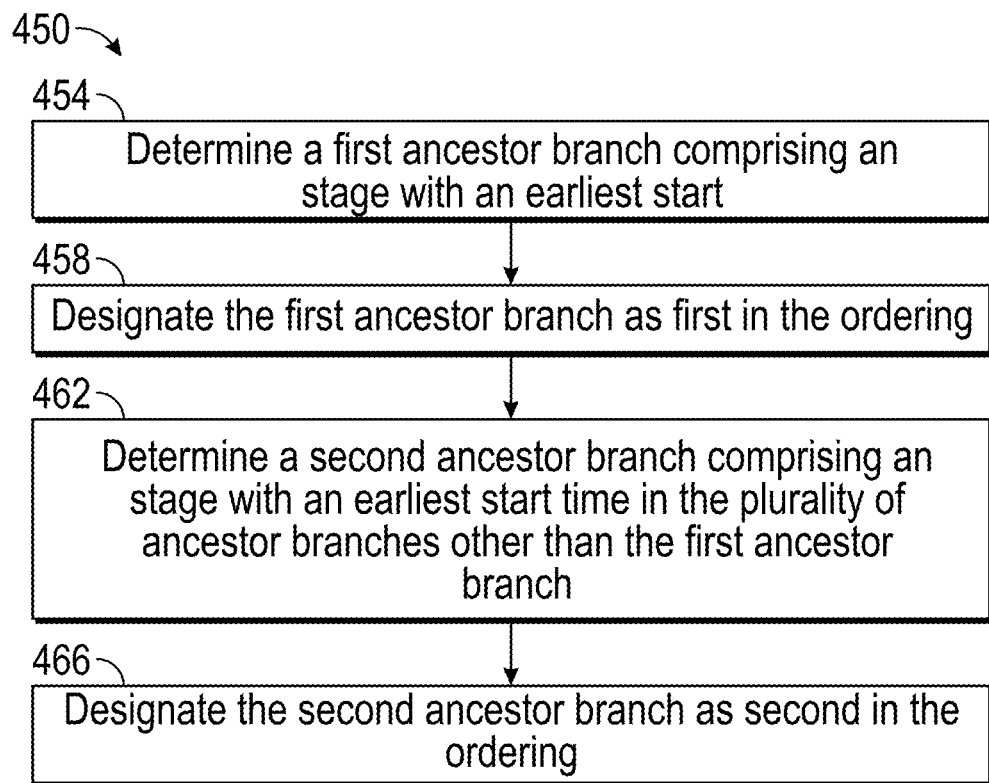
FIG. 8B shows an example method for determining the ordering of the nodes for display, according to one or more embodiments.

FIGS. 8A and 8B illustrate example computer-implemented methods, according to implementations of the present disclosure. A system described herein (e.g., the user interface generation system 108, the master processing system 102 with respect to FIG. 1) may perform one or both of these methods. FIG. 8A shows an example method 400 for displaying computation analysis. The method 400 includes at block 404 receiving a plurality of stages each having an associated duration of time, start time, and end time. These stages may include a logical relation to each other. For example, the certain stages may be prerequisite to other stages, such as later stages. Multiple prerequisite stages may need to be executed before a later stage. Such prerequisite stages may be referred to as ancestor stages, and the later stage may be referred to as a base stage. At block 406 the method 400 can include determining the one or more sets of connected stages. This can include identifying that certain steps are prerequisite to other steps. The connected sets of stages may correspond to completed stages. In some embodiments, connected sets of states may include stages that are in-progress or stages that are yet to be executed. Thus, depending on characteristic of the particular executable task computation system whether a stage is prerequisite to a second stage may not be identified until the prerequisite stage has been completed and the second stage initiated. Thus, the system may need to repeatedly go through step of determining the one or more sets of connected stages.

Once at least some logical relationships among stages have been identified, the method 400 can include a subroutine or sub-algorithm that can be performed for each set of connected stages. The subroutine can begin at block 408. At block 408, the method 400 includes determining a base stage, of the plurality of connected stages, having a latest end time. The system may determine a plurality of ancestor branches of the base stage at block 412. Each of the plurality of ancestor branches may comprise a respective one or more stages of the plurality of stages. At block 416, the system determines an ordering of the plurality of ancestor branches. The ordering can include one or more features described in more detail with respect to FIG. 8B. At block 418, the method 400 can include recursively analyzing each ancestor branch to determine ordering of respective sets of sub-nodes within each of those ancestor branches. In this recursive process, for example, the sub-node of a given ancestor branch with a latest end time may be designated as a base sub-node, and the ancestor branches of that base sub-node may be determined and analyzed in a manner similar to the processes described above and below in reference to FIG. 8B. Thus, the ordering described, for example, in FIG. 8B can be repeated recursively within the subroutine for each set of sub-nodes.

At block 420, the method 400 may optionally include determining a size of one or more input data indicators or output data indicators. The total size of the output data indicators that are associated with a group of parent executable task nodes can equal a total size (e.g., length) of an input data indicator that is associated with a child executable task. Additionally or alternatively, the user interface can size all of the input and/or output data indicators so that each indicator is proportional in size to the amount of data input or output from the associated node. The size of the indicators may be determined dynamically and/or in real time. For example, if a currently executed executable task takes in an unusually large amount of data, the size of the input data indicator may cause a need for previously sized input and/or output data indicators to be resized. The size of each of the indicators (e.g., input data indicators, output data indicators) may be sized relative to each of the other indicators already presented. The size of indicators may be compared among other indicators of the same type. For example, the size of all input data indicators may be scaled according to a first scaling corresponding the input data indicators, and the size of all output data indicators may be scaled according to a second scaling corresponding to the output data indicators. The first and second scalings may be the same or may be different. Moreover, one or both scalings may change in real time as the execution of additional stages is completed.

At block 424, the method 400 can optionally include generating data for displaying a concurrency indicator within a concurrence graph. In some embodiments, the indication of processing resources used (e.g., height of the concurrency indicator) at each point in time during concurrent execution of the combination of stages. The height of the concurrency indicator may be calculated based on a total amount of processing resources that are simultaneously used at each point in time.

At block 428, the system generates user interface data configured for displaying one or more elements. For example, the data may be configured to display a base node that represents the base stage. The data may be configured to display first and second sets of sub-nodes representing the respective one or more stages of the respective first and second ancestor branches. Each sub-node of the first set of sub-nodes may be displayed vertically displaced from each sub-node of the second set of sub-nodes based at least in part on the ordering. First and/or subsequent connectors can be displayed. The first connector indicates a connection between the base node and at least one sub-node of the first set of sub-nodes. The subsequent connectors indicate a connection between the base node and at least one sub-node of the remaining set of sub-nodes. Thus, the connector indicators may indicate one or more branchings. The system can generate and/or update the data repeatedly. For example, as additional stages begin and complete execution, the system may update, for example, the display (e.g., location, size, orientation) of the base node, sub-nodes, and the connectors of each of the sets of connected stages. Moreover, other aspects of the user interface, such as an associated concurrence graph described herein and/or one or more elements therein, may be updated repeatedly. Thus, the system may provide an animation based on the repeatedly updating information. During the animation, one or more of the features described above may be repeatedly updated. The updates may occur, for example, at regular time intervals (e.g., every second or portion thereof, every day), after the completion of a stage and/or executable task, at the completion of a set of tasks, or at any other time interval.

FIG. 8B shows an example method 450 for determining the ordering of the nodes for display. The method 450 can include a block 454 determining a first ancestor branch, of the plurality of ancestor branches, comprising a stage with an earliest start time among the start times associated with the stages of the plurality of ancestor branches. At block 458, the method 450 can include designating the first ancestor branch as first in the ordering. At block 462, the method 450 can include determining subsequent ancestor branches, of the plurality of ancestor branches, comprising a stage with an earliest start time among the start times associated with the stages of the plurality of ancestor branches other than the ancestor branches which have already been determined in earlier steps of the procedure. The system may at block 466 designate a subsequent ancestor branch as subsequent in the ordering.

Other steps may additionally or alternatively be included. For example, the system may receive a user selection of one or more of the base node, a sub-node of the first set of sub-nodes, or a sub-node of the second set of sub-nodes. Based on the user selection, the system may update the user interface data to cause display of an attribute of the corresponding stage associated with the selected node or sub node. The system may repeatedly determine and designate, in the ordering, other branches of the plurality of ancestor branches, as necessary. These may be based on earliest start times of stages associated with the respective others of the plurality of ancestor branches. These branches may be displayed using additional sets of sub-nodes each representing the respective one or more stages of the respective others of the plurality of ancestor branches. Each set of sub-nodes of the additional sets of sub-nodes may be displayed vertically displaced from other sets of sub-nodes of the additional sets of sub nodes. The display of each node and sub-node may be based in part on the ordering. Additional connectors (e.g., indicating connections between the base node and one or more sub-nodes of the additional sets of sub-nodes) may be displayed additionally or alternatively. The system may further recursively perform one or more of the operations described above, for each of the plurality of ancestor branches.

EXAMPLE EMBODIMENTS

Some example embodiments are provided below for illustration purposes. Additional or alternative examples are possible, such as those listed below:

In a 1st Example, a computer-implemented method for displaying computation analysis includes: receiving a plurality of stages each having an associated duration of time, start time, and end time; determining a base stage, of the plurality of stages, having a latest end time; determining a plurality of ancestor branches of the base stage, wherein each of the plurality of ancestor branches comprises a respective one or more stages of the plurality of stages; determining an ordering of the plurality of ancestor branches, wherein determining the ordering comprises: determining a first ancestor branch, of the plurality of ancestor branches, comprising a stage with an earliest start time among the start times associated with the stages of the plurality of ancestor branches; designating the first ancestor branch as first in the ordering; determining a second ancestor branch, of the plurality of ancestor branches, comprising a stage with an earliest start time among the start times associated with the stages of the plurality of ancestor branches other than the first ancestor branch; and designating the second ancestor branch as second in the ordering; and generating user interface data configured for displaying: a base node representing the base stage; first and second sets of sub-nodes representing the respective one or more stages of the respective first and second ancestor branches, wherein each sub-node of the first set of sub-nodes is displayed vertically displaced from each sub-node of the second set of sub-nodes based at least in part on the ordering; a first connector indicating a connection between the base node and at least one sub-node of the first set of sub-nodes; and a second connector indicating a connection between the base node and at least one sub-node of the second set of sub-nodes.

In a 2nd Example, the computer-implemented method of Example 1, further comprising: receiving a user selection of at least one of: the base node, a sub-node of the first set of sub-nodes, or a sub-node of the second set of sub-nodes; and based on the user selection, updating the user interface data to cause display of an attribute of the corresponding stage associated with the selected node or sub node.

In a 3rd Example, the computer-implemented method of any of Examples 1-2, wherein determining the ordering further comprises: further repeatedly determining and designating, in the ordering, others of the plurality of ancestor branches, as necessary, based on start times of stages associated with the respective others of the plurality of ancestor branches.

In a 4th Example, the computer-implemented method of Example 3 further comprising: further generating user interface data configured for displaying: additional sets of sub-nodes representing the respective one or more stages of the respective others of the plurality of ancestor branches, wherein each set of sub-nodes of the additional sets of sub-nodes is displayed vertically displaced from other sets of sub-nodes of the additional sets of sub nodes based at least in part on the ordering; and additional connectors indicating connections between the base node and at least one sub-node of each of the additional sets of sub-nodes.

In a 5th Example, the computer-implemented method of any of Examples 1-4 further comprising: further recursively performing the following operations, for each of the plurality of ancestor branches, as necessary: determining a sub-base stage, of the one or more stages of the ancestor branch, having a latest end time; determining one or more ancestor sub-branches of the sub-base stage, wherein each of the one or more ancestor sub-branches comprises a respective one or more stages of the one or more stages of the ancestor branch; and ordering the plurality of ancestor sub-branches based on start times of stages associated with the respective plurality of ancestor sub-branches; and further generating user interface data configured for displaying, for each of the plurality of ancestor branches, as necessary: a base sub-node representing the sub-base stage of the ancestor branch; additional sets of sub-nodes representing the respective one or more stages of the respective one or more ancestor sub-branches, wherein each set of sub-nodes of the additional sets of sub-nodes is displayed vertically displaced from each sub-node of other sets of sub-nodes of the additional sets of sub nodes based at least in part on the ordering; and additional connectors indicating connections between the base sub-node and at least one sub-node of each of the additional sets of sub-nodes, wherein the base sub-node and the additional sets of sub-nodes comprise the first or second sets of sub-nodes in cases where the ancestor branch comprises the first or second ancestor branch, respectively.

In a 6th Example, the computer-implemented method of Example 5 further comprising: further recursively ordering, as necessary, further ancestor sub-branches of each of the sub-branches; and further generating user interface data configured for displaying, for each further ancestor sub-branch of each of the sub-branches, as necessary, yet additional sets of sub nodes and corresponding connectors, wherein the yet additional sets of sub-nodes are displayed vertically displaced based at least in part on the associated orderings.

In a 7th Example, the computer-implemented method of any of Examples 1-5 further comprising: determining, based at least in part on a quantity of data input to the base stage, a length of an input data indicator associated with the base node; and further generating user interface data configured for displaying the input data indicator above the base node, wherein at least the first connector connects to the input data indicator.

In an 8th Example, the computer-implemented method of Example 7 further comprising: determining, based at least in part on respective quantities of data output by one or more stages of the respective first and second ancestor branches, lengths of respective output data indicators associated with respective sub-nodes of the first and second sets of sub-nodes; and further generating user interface data configured for displaying the respective output data indicators below the associated sub-nodes.

In a 9th Example, the computer-implemented method of Example 8, wherein the lengths of the input data indicator and the output data indicators are further determined such that the lengths are relatively sized based on the relative quantities of data input to and output by the associated stages.

In a 10th Example, the computer-implemented method of Example 9 further comprising: receiving an executing stage; determining a current length of a current node associated with the executing stage; and generating updated user interface data configured for resizing a length of each of the base node, the nodes from each of the plurality of ancestor branches, and the current node.

In an 11th Example, the computer-implemented method of Example 10 further comprising: determining a relative length of an input data indicator associated with the current node associated with the executing stage; and generating updated user interface data configured for resizing a relative length of each of the input data indicators associated with each of the base node, the nodes from each of the plurality of ancestor branches, and the current node.

In a 12th Example, the computer-implemented method of any of Examples 1-11 further comprising: determining a completed portion of the base node relative to a total required processing; and generating user interface data configured for displaying a completion indicator indicating the completed portion.

In a 13th Example, the computer-implemented method of any of Examples 1-12 further comprising: determining an amount of processing associated with the base node; and generating user interface data configured for displaying a concurrency indicator within a concurrence graph, the concurrency indicator comprising an indication of the amount of processing associated with the base node.

In a 14th Example, the computer-implemented method of Example 13, wherein generating the user interface data configured for displaying the concurrency indicator comprises data configured for displaying the concurrency indicator vertically aligned with the base node.

In a 15th Example, the computer-implemented method of any of Examples 13-14, wherein the amount of processing comprises a number of processors.

In a 16th Example, the computer-implemented method of any of Examples 13-15, further comprising: receiving a user selection of the concurrency indicator; and based on the selection of the concurrency indicator, displaying an indication of the amount of processing associated with the base node.

In a 17th Example, a computer-implemented method for animating computation analysis, the method comprising: receiving one or more stages each having an associated start time and end time; receiving an executing stage having a start time and a current duration, the current duration representing a dynamically updating duration during execution of the executing stage; determining that the one or more stages comprise ancestor stages of the executing stage, the ancestor stages each having an end time before the time of the executing stage; determining an ordering of the ancestor stages; generating user interface data configured for displaying: a current node representing the executing stage; and one or more sub-nodes representing the respective one or more ancestor stages, wherein each sub-node is displayed vertically displaced from the current node; and generating updated user interface data, comprising: based on the current duration of the executing stage, dynamically updating lengths of the current node and the one or more sub-nodes.

In an 18th Example, the computer-implemented method of example 17, wherein determining the ordering comprises: determining a first ancestor branch comprising a stage with an earliest start time among the start times of the one or more stages, wherein the one or more stages comprises a plurality of stages; designating the first ancestor branch as first in the ordering; determining a second ancestor branch comprising a stage with an earliest start time among start times of the one or more stages not comprising the first ancestor branch; and designating the second ancestor branch as second in the ordering.

In a 19th Example, the computer-implemented method of example 18 further comprising: a first connector indicating a connection between the current node and at least one sub-node of associated with the first ancestor branch; and a second connector indicating a connection between the current node and at least one sub-node associated with the second ancestor branch.

In a 20th Example, the computer-implemented method of any of Examples 17-19 further comprising: determining a relative length of an input data indicator associated with the current node, the input data indicator representing an amount of input data associated with the executing stage; determining relative lengths of input data indicators associated with the one or more stages, the determination of relative lengths comprising determining an amount of data that is input into each of the one or more stages; and generating updated user interface data configured for resizing a relative length of each of the input data indicators associated with each of the current node and the one or more sub-nodes.

In a 21st Example, a system comprising: a computer readable storage medium having program instructions embodied therewith; and one or more processors configured to execute the program instructions to cause the system to perform the computer implemented method of any of Examples 1-20.

In a 22nd Example, a computer program product comprising a computer readable storage medium having program instructions embodied therewith, the program instructions executable by one or more processors to cause the one or more processors to perform the computer implemented method of any of Examples 1-20.

Additional Implementation Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operation system software, such as Mac OS, iOS, Android, Chrome OS, Windows OS (e.g., Windows XP, Windows Vista, Windows 7, Windows 8, Windows 10, Windows Server), Windows CE, Unix, Linux, SunOS, Solaris, Blackberry OS, VxWorks, or other suitable operation systems. In other embodiments, the computing devices may be controlled by a proprietary operation system. Conventional operation systems control and schedule computer processes for execution, perform memory management, provide file system, networking, I/O services, and provide a user interface functionality, such as a graphical user interface ("GUI"), among other things.

Figure 9:
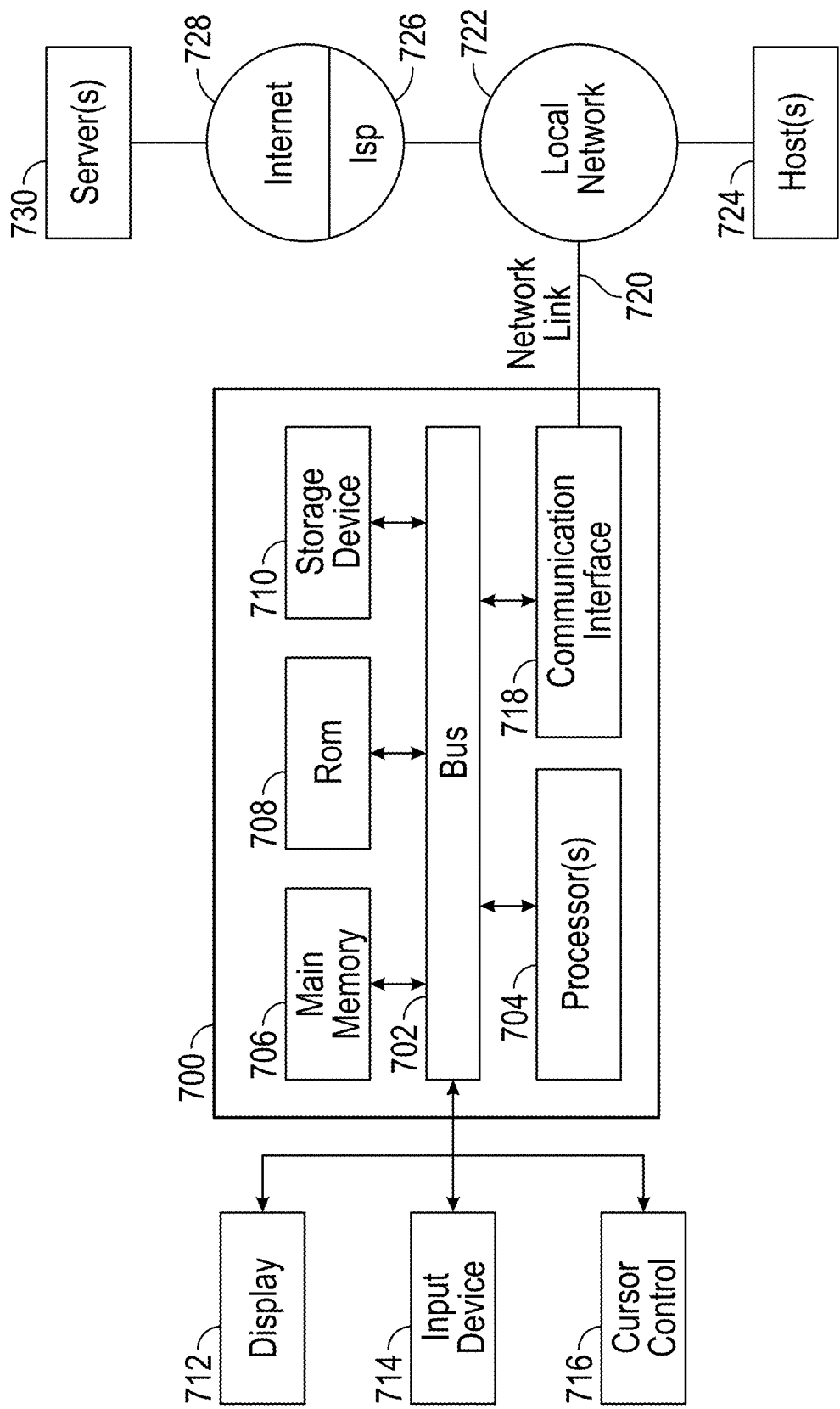
FIG. 9 is a block diagram that illustrates a computer system upon which various embodiments of the present disclosure may be implemented.

For example, FIG. 9 is a block diagram that illustrates a computer system 700 upon which various embodiments may be implemented. For example, the computer system 700 may be implemented as master processing system 102 or the user interface generation system 108 (see, e.g., FIG. 1) in some embodiments. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method for displaying computation analysis, the method comprising:
   receiving a plurality of stages each having an associated duration of time, start time, and end time;
   determining a base stage, of the plurality of stages, having a latest end time;
   determining a plurality of ancestor branches of the base stage, wherein each of the plurality of ancestor branches comprises a respective one or more stages of the plurality of stages;
   determining an ordering of the plurality of ancestor branches, wherein determining the ordering comprises:
      determining a first ancestor branch of the plurality of ancestor branches, comprising a stage with an earliest start time among the start times associated with the stages of the plurality of ancestor branches;
      designating the first ancestor branch as first in the ordering;
      determining a second ancestor branch of the plurality of ancestor branches, comprising a stage with an earliest start time among the start times associated with the stages of the plurality of ancestor branches other than the first ancestor branch, the first ancestor branch having no stages common with the second ancestor branch; and
      designating the second ancestor branch as second in the ordering; and generating user interface data configured for displaying:
         a base node representing the base stage;
         first and second sets of sub-nodes representing the respective one or more stages of the respective first and second ancestor branches, wherein each sub-node of the first set of sub-nodes is displayed vertically displaced from each sub-node of the second set of sub-nodes based on the ordering;
         a first connector indicating a connection between the base node and at least one sub-node of the first set of sub-nodes; and
         a second connector indicating a connection between the base node and at least one sub-node of the second set of sub-nodes;
   determining an amount of processing associated with the base node; and
   generating user interface data configured for displaying a concurrency indicator within a concurrence graph, the concurrency indicator comprising an indication of the amount of processing associated with the base node and having a length related to a length of the base node.

2. The computer-implemented method of claim 1 further comprising:
   receiving a user selection of at least one of: the base node, a sub-node of the first set of sub-nodes, or a sub-node of the second set of sub-nodes; and
   based on the user selection, updating the user interface data to cause display of an attribute of the corresponding stage associated with the selected node or sub-node.

3. The computer-implemented method of claim 1, wherein determining the ordering further comprises:
   further repeatedly determining and designating, in the ordering, others of the plurality of ancestor branches, as necessary, based on start times of stages associated with the respective others of the plurality of ancestor branches.

4. The computer-implemented method of claim 3 further comprising:
   further generating user interface data configured for displaying:
      additional sets of sub-nodes representing the respective one or more stages of the respective others of the plurality of ancestor branches, wherein each set of sub-nodes of the additional sets of sub-nodes is displayed vertically displaced from other sets of sub-nodes of the additional sets of sub-nodes based at least in part on the ordering; and
      additional connectors indicating connections between the base node and at least one sub-node of each of the additional sets of sub-nodes.

5. The computer-implemented method of claim 1 further comprising:
   further recursively performing the following operations, for each of the plurality of ancestor branches, as necessary:
      determining a sub-base stage, of the one or more stages of the ancestor branch, having a latest end time;
      determining one or more ancestor sub-branches of the sub-base stage, wherein each of the one or more ancestor sub-branches comprises a respective one or more stages of the one or more stages of the ancestor branch; and ordering the plurality of ancestor sub-branches based on start times of stages associated with the respective plurality of ancestor sub-branches; and further generating user interface data configured for displaying, for each of the plurality of ancestor branches, as necessary:

a base sub-node representing the sub-base stage of the ancestor branch;

additional sets of sub-nodes representing the respective one or more stages of the respective one or more ancestor sub-branches, wherein each set of sub-nodes of the additional sets of sub-nodes is displayed vertically displaced from each sub-node of other sets of sub-nodes of the additional sets of sub-nodes based at least in part on the ordering; and additional connectors indicating connections between the base sub-node and at least one sub-node of each of the additional sets of sub-nodes, wherein the base sub-node and the additional sets of sub-nodes comprise the first or second sets of sub-nodes in cases where the ancestor branch comprises the first or second ancestor branch, respectively.

6. The computer-implemented method of claim 5 further comprising:

further recursively ordering, as necessary, further ancestor sub-branches of each of the sub-branches; and further generating user interface data configured for displaying, for each further ancestor sub-branch of each of the sub-branches, as necessary, yet additional sets of sub-nodes and corresponding connectors, wherein the yet additional sets of sub-nodes are displayed vertically displaced based at least in part on the associated orderings.

7. The computer-implemented method of claim 1 further comprising:

determining, based at least in part on a quantity of data input to the base stage, a length of an input data indicator associated with the base node; and further generating user interface data configured for displaying the input data indicator above the base node, wherein at least the first connector connects to the input data indicator.

8. The computer-implemented method of claim 7 further comprising:

determining, based at least in part on respective quantities of data output by one or more stages of the respective first and second ancestor branches, lengths of respective output data indicators associated with respective sub-nodes of the first and second sets of sub-nodes; and further generating user interface data configured for displaying the respective output data indicators below the associated sub-nodes.

9. The computer-implemented method of claim 8, wherein the lengths of the input data indicator and the output data indicators are further determined such that the lengths are relatively sized based on the relative quantities of data input to and output by the associated stages.

10. The computer-implemented method of claim 9 further comprising:

receiving an executing stage;

determining a current length of a current node associated with the executing stage; and generating updated user interface data configured for resizing a length of each of the base node, the nodes from each of the plurality of ancestor branches, and the current node.

11. The computer-implemented method of claim 10 further comprising:

determining a relative length of an input data indicator associated with the current node associated with the executing stage; and generating updated user interface data configured for resizing a relative length of each of the input data indicators associated with each of the base node, the nodes from each of the plurality of ancestor branches, and the current node.

12. The computer-implemented method of claim 1 further comprising:

determining a completed portion of the base node relative to a total required processing; and generating user interface data configured for displaying a completion indicator indicating the completed portion.

13. The computer-implemented method of claim 1, wherein generating the user interface data configured for displaying the concurrency indicator comprises data configured for displaying the concurrency indicator vertically aligned with and vertically displaced from the base node.

14. The computer-implemented method of claim 1, wherein the amount of processing comprises a number of processors.

15. The computer-implemented method of claim 1, further comprising:

receiving a user selection of the concurrency indicator; and based on the selection of the concurrency indicator, displaying an indication of the amount of processing associated with the base node.

16. The computer-implemented method of claim 1, wherein at least one of the first or second ancestor branches comprises two or more stages.

17. The computer-implemented method of claim 1, wherein generating the user interface data comprises displaying all sub-nodes of the first ancestor branch above all sub-nodes of the second ancestor branch.

18. The computer-implemented method of claim 1, wherein the concurrency indicator further comprises a combination of a plurality of indications of amounts of processing associated with the base node and the first and second sets of sub-nodes.

19. A computer-implemented method for animating computation analysis, the method comprising:

receiving one or more stages each having an associated start time and end time;

receiving an executing stage having a start time and a current duration, the current duration representing a dynamically updating duration during execution of the executing stage;

determining that the one or more stages comprise ancestor stages of the executing stage, the ancestor stages each having an end time before the time of the executing stage;

determining an ordering of the ancestor stages;

generating user interface data configured for displaying:

a current node representing the executing stage; and one or more sub-nodes representing the respective one or more ancestor stages, wherein each sub-node is displayed vertically displaced from the current node; and generating updated user interface data, comprising:

based on the current duration of the executing stage, dynamically updating lengths of the current node and the one or more sub-nodes;

determining an amount of processing associated with the current node; and displaying a concurrency indicator within a concurrence graph, the concurrency indicator comprising an indication of the amount of processing associated with the current node and having a length related to a length of the current node.

20. The computer-implemented method of claim 19, wherein determining the ordering comprises:

determining a first ancestor branch comprising a stage with an earliest start time among the start times of the one or more stages, wherein the one or more stages comprises a plurality of stages;

designating the first ancestor branch as first in the ordering;

determining a second ancestor branch comprising a stage with an earliest start time among start times of the one or more stages not comprising the first ancestor branch; and designating the second ancestor branch as second in the ordering.

21. The computer-implemented method of claim 20 further comprising:

a first connector indicating a connection between the current node and at least one sub-node of associated with the first ancestor branch; and a second connector indicating a connection between the current node and at least one sub-node associated with the second ancestor branch.

22. The computer-implemented method of claim 19 further comprising:

determining a relative length of an input data indicator associated with the current node, the input data indicator representing an amount of input data associated with the executing stage;

determining relative lengths of input data indicators associated with the one or more stages, the determination of relative lengths comprising determining an amount of data that is input into each of the one or more stages; and generating updated user interface data configured for resizing a relative length of each of the input data indicators associated with each of the current node and the one or more sub-nodes.

* * * * *